United States Patent
Abreu et al.

[11] Patent Number: 6,014,376
[45] Date of Patent: Jan. 11, 2000

[54] METHOD FOR OVER-THE-AIR SYNCHRONIZATION ADJUSTMENT IN A COMMUNICATION SYSTEM

[75] Inventors: Victor M. Abreu; Raul A. Pombo, both of Grayslake, Ill.; Paul D. Marko, Pembroke Pines; David L. Brown, Lake Worth, both of Fla.

[73] Assignee: Motorola, Inc., Schaumburg, Ill.

[21] Appl. No.: 08/715,508

[22] Filed: Sep. 18, 1996

[51] Int. Cl.[7] .................................................. H04J 3/06
[52] U.S. Cl. ..................... 370/350; 370/324; 370/337; 370/347; 370/503; 375/200
[58] Field of Search ..................... 370/330, 331, 370/332, 336, 337, 347, 350, 324, 503, 508, 512; 375/200, 202; 455/440, 456

[56] References Cited

U.S. PATENT DOCUMENTS

| | | | |
|---|---|---|---|
| 5,077,790 | 12/1991 | D'Amico et al. | 380/23 |
| 5,285,443 | 2/1994 | Patsiokas et al. | 370/29 |
| 5,363,375 | 11/1994 | Chuang et al. | 370/95.3 |
| 5,388,102 | 2/1995 | Griffith et al. | 370/512 |
| 5,430,760 | 7/1995 | Dent | 375/200 |
| 5,448,570 | 9/1995 | Toda et al. | 370/337 |
| 5,528,597 | 6/1996 | Gerszberg et al. | 370/347 |
| 5,530,704 | 6/1996 | Gibbons et al. | 370/94.2 |
| 5,537,685 | 7/1996 | Matsuno | 370/350 |

FOREIGN PATENT DOCUMENTS

| | | | |
|---|---|---|---|
| 0 634 851 A2 | 1/1995 | European Pat. Off. | H04J 3/06 |

OTHER PUBLICATIONS

*Personal Handy Phone System RCR Standard STD–28*, Version 1 (Rev. 1), Section 4.2.9, pp. 67–72, Mar. 3, 1995.
*Digital European Cordless Telecommunications (DECT) Common Interface, Part 2: Physical Layer*, ETS 300 175–2, Section 4.2, pp. 15–18, 1995.

*Primary Examiner*—Douglas W. Olms
*Assistant Examiner*—Shick Hom
*Attorney, Agent, or Firm*—John G. Rauch; Brian M. Mancini

[57] ABSTRACT

A method for synchronizing base stations (104, 106, 108, 110) or radio ports in a communication system (100) such as a cordless or cellular telephone system uses a mobile station (114) or handset for synchronizing unsynchronized base stations. The mobile station (114) is first synchronized to a reference base station. The mobile station (114) then initiates communication with the unsynchronized base station and calculates a synchronization adjustment. The mobile station (114) transmits the synchronization adjustment to the unsynchronized base station which uses the synchronization adjustment to adjust its time base.

13 Claims, 3 Drawing Sheets

METHOD FOR OVER-THE-AIR SYNCHRONIZATION ADJUSTMENT IN A COMMUNICATION SYSTEM

FIELD OF THE INVENTION

The present invention relates generally to communication systems. The present invention relates more particularly to synchronization of base stations in a time division, multiple access communication system.

BACKGROUND OF THE INVENTION

In a time division, multiple access (TDMA) radio communication system, communication channels are provided by dividing the frequency spectrum and the time base into periodically repeated time frames and time slots at preassigned frequencies. Two stations in such a system communicate by transmitting and receiving on a specified frequency during specified time slots.

Such systems commonly include multiple fixed base stations configured for radio communication with one or more mobile stations, or handsets. The base stations are hard wired to a controller and to the public switched telephone network (PSTN) for completing telephone calls between a handset and the PSTN. Examples of such systems include cordless telephone systems according the Digital European Cordless Telecommunication (DECT) standard and the Personal Handyphone System (PHS) in Japan, and digital cellular telephone systems.

For accurate, efficient communications in such systems, the base stations must be synchronized to a common time base. If timing is not synchronized, the timing at which a signal is transmitted from one base station overlaps the signal transmission timing for another base station. This creates errors and inefficiency. A handset operating in the system synchronizes to the base station with which it is communicating. If base stations are unsynchronized, interference occurs in the communication between the handset and its base station. Also, hand-off of communication between the handset and a first base station to a second base station may not be possible. All base stations should be synchronized to a master clock for the system, kept, for example, at the controller. Synchronization may occur at the time of system set-up or when a new base station is installed or as part of routine system maintenance.

For synchronizing timing of the base stations, conventional systems provide a hard-wired synchronization line which couples each base station in the system to the master clock at the controller. Each base station establishes its timing in response to timing signals on the synchronization line. Handsets in the region near the base station synchronize to the timing established at the base station.

Use of the synchronization line introduces error in synchronization between base stations. The synchronization line adds a propagation delay to the synchronizing signals from the controller to the respective base stations. The length of the synchronization line between a base station and the controller varies from each base station. The propagation delay is proportional to the length of the synchronization line. Thus, the propagation delay for each base station is different, less for a base station near the controller and more for a base station remote from the controller. Each system specifies a maximum synchronization tolerance, or the maximum timing difference between the base station and a handset. For example, in a DECT system, the maximum synchronization tolerance is 2 µsec. The propagation delays to remote base stations may cause such remote base stations to be outside the system synchronization tolerance and thus be unsynchronized. Propagation delays can only be matched by trial-and-error measurement of synchronization line lengths.

As an alternative to the synchronization line, other conventional systems transmit a synchronization signal from the controller to all base stations in the system using radio frequency communication. Each base station receives the signal and synchronizes its timing to the synchronization signal. This eliminates inaccuracies due to varying propagation delays in the hard-wired synchronization line.

However, such a system requires a controller with the ability to transmit to physically remote base stations. It may be expensive, impractical, physically impossible or not allowed by power allocation requirements, to provide a transmitter with sufficient transmit power for transmitting the synchronization signal to all base stations in the system.

Accordingly, there is a need in the art for an improved method for synchronizing base stations in a communication system which overcomes these limitations in conventional systems.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
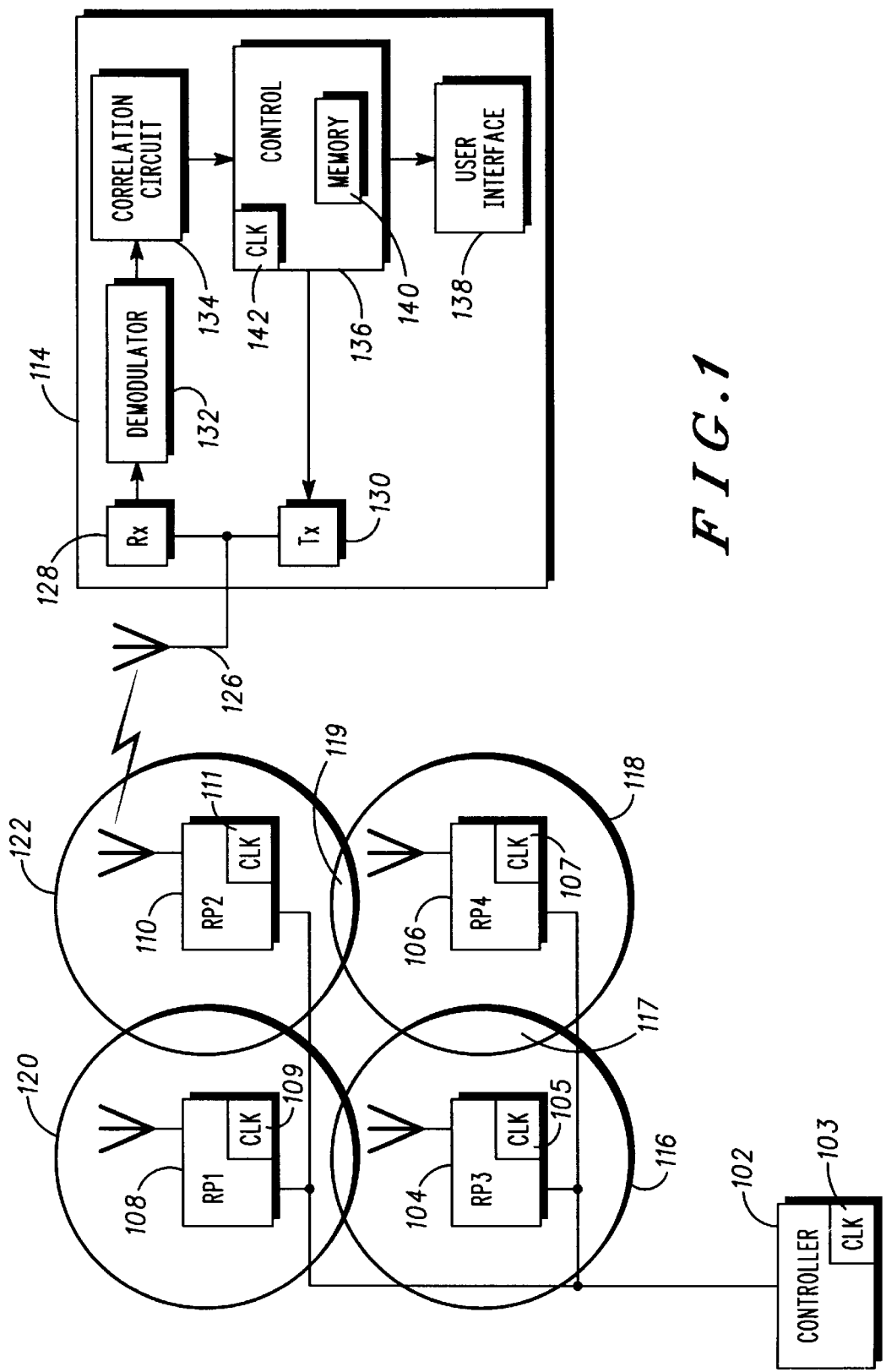
FIG. 1 is an operational block diagram of a communication system.

Referring now to FIG. 1, it shows an operational block diagram of a communication system 100. The communication system 100 includes a controller 102 and a plurality of radio ports or base stations, including base station 104, base station 106, base station 108 and base station 110. Each base station is configured to provide communication service to communication devices such as a mobile station 114 located within an associated service area. Thus, base station 104 provides communication service to service area 116; base station 106 provides communication service to service area 118; base station 108 provides communication service to service area 120; and base station 110 provides communication service to service area 122. The communication system 100 is preferably designed with service overlap areas, such as service overlap area 117 which receives communication service from both base station 104 and base station 106 and service overlap area 119 which receives communication service from both base station 108 and base station 110. As will be recognized by those ordinarily skilled in the art, the communication system 100 may include any suitable number of base stations.

Communication within the communication system 100 is controlled by the controller 102, which is linked by wireline to each base station. In addition, the controller is preferably linked to the public switched telephone network (PSTN) to provide communication between communication devices such as mobile station 114 and the PSTN. The controller 102 includes a master clock 103.

The communication system 100 may be a cellular or cordless telephone system or trunked radio system or another similar communication system. For example, the communication system 100 may be a cordless radiotelephone system according to the Digital European Cordless Telecommunications (DECT) standard, or a cordless radiotelephone system according to the Japanese Personal Handy Phone System (PHS) or a cellular telephone system.

Operation of one base station in the communication system 100 will be discussed using base station 104 as an example. However, it is to be understood that all base stations serving all areas operate in substantially the same manner. Also, the mobile station 114 may be moved among any of the service areas 116, 118, 120, 122 to establish communications with any of base stations 104, 106, 108, 110. When this occurs during an active call, hand-off of the call from one base station to another will occur.

The base station 104 sends and receives radio frequency (RF) signals to and from mobile stations within the fixed service area 116 in which the base station 104 is located. The RF signals include voice information and/or digital data transmitted serially and modulated by a carrier frequency. Preferably, communication in the communication system 100 is time division, multiple access (TDMA), in which the mobile station 114 and each base station only transmit during preassigned time slots. Each time slot comprises a predetermined number of bits. In turn, the time slots form frames and frames form a multiframe (DECT) or a superframe (PHS). For accurate communication, the base station 104 and the mobile station 114 must be in bit, slot, frame and multiframe (superframe) synchronization.

A plurality of control channels are used for conveying control information for communication between the mobile station 114 and the base station 104. Location of the control channels is defined by the system protocol.

Some control channels are broadcast by the base station 104 and contain predetermined information, such as a synchronization signal to permit the mobile station 114 to synchronize its time base to the time base of the base station 104. For example, in a communication system according to the PHS specification, during each transmission time slot, the base station 104 transmits a bit string called a unique word which is used for synchronization by the mobile station 114. Similarly, in a communication system according to the DECT specification, each time slot transmission for each base station includes synchronization bits referred to as the S-field, which is used for synchronization by the mobile station 114. Control channels also include base station identification information, which uniquely identifies the base station originating the transmission. Such broadcast control channels may be received and read by any suitable communication device located in the service area or in nearby service areas.

Each base station includes a local clock. Thus, base station 104 includes a local clock 105, base station 106 includes a local clock 107, base station 108 includes a local clock 109 and base station 110 includes a local clock 111. The local clock is used for establishing the time base at the base station. Each local clock must be synchronized to the master clock 103 at the controller 102.

The mobile station 114 may comprise a mobile radiotelephone mounted in an automobile or other vehicle or a portable radiotelephone such as a cordless telephone or a cellular telephone which may be carried by a user. The mobile station 114 may be transported and operated anywhere in the service area served by any of base station 104, base station 106, base station 108 or base station 110. The mobile station 114 is also referred to herein as a handset.

The mobile station 114 includes an antenna 126, a tunable receiver 128, a transmitter 130, a demodulator 132, a correlation circuit 134, a controller 136 and a user interface 138. Upon reception of RF signals, the antenna 126 detects the received RF signals. The tunable receiver 128 is coupled to the antenna 126 and converts the RF signals into baseband signals. The channel or frequency at which the tunable receiver 128 receives signals is controlled by the controller 136. The demodulator 132 is coupled to the receiver 128. The demodulator 132 demodulates the baseband signals, and provides the data to the correlation circuit 134. The correlation circuit 134 correlates the digital data and recovers the data transmitted on the RF signals. The correlation circuit 134 provides the recovered data to the controller 136.

In response to data received from the correlation circuit 134, the controller 136 formats the data into recognizable voice or information for use by user interface 138. The user interface 138 communicates the received information or voice to a user. Typically, the user interface 138 includes a display, a keypad, a speaker and a microphone.

Upon transmission of radio frequency signals from the mobile station 114 to the base station 104, the user interface 138 transmits user input data to the controller 136. The controller 136 formats the information obtained from the user interface 138 and conveys it to the transmitter 130 for conversion into RF modulated signals. The transmitter 130 applies the RF modulated signals to the antenna 126 for transmission to the base station 104. The mobile station 114 may include other operational elements suitable for operation in various communication systems.

The controller 136 preferably comprises a microprocessor or microcontroller for controlling the operation of the mobile station 114. The controller 136 includes a memory 140 for storing data and instructions for use by the mobile station 114. The controller 136 operates in response to a predetermined program of instructions stored in the memory 140. Moreover, the controller 136 receives control information from elements of the mobile station 114.

The controller 136 includes a clock 142 for establishing the time base of the mobile station 114. The clock 142 produces clocking signals for controlling the time response of the mobile station 114.

For accurate communication with the base station 104, the time base of the mobile station 114 must be synchronized with the time base of the base station 104. Synchronization ensures that the mobile station 114 and the base station 104 share common bit, slot, frame and multiframe (or superframe) boundaries. The mobile station 114 periodically re-synchronizes its time base to the base station 104. The mobile station 114 detects a synchronization transmission transmitted by the base station and synchronizes the time base of the mobile station in response to the synchronization transmission. For example, the mobile station 114 examines the unique word or S-field received from the base station 104 and makes any necessary adjustments to ensure synchronization.

To further ensure accurate communication in the communication system 100, each radio port or base station 104, 106, 108, 110 must be synchronized to the controller 102. For synchronizing, the controller conveys to each base station a clock or timing signal over the wirelines connecting the controller to each base station. Because the wirelines have differing lengths, differing propagation delays are introduced. In accordance with the present invention, a method for synchronizing base stations in a communication system includes synchronizing the mobile station 114 to a reference base station and, thereafter, synchronizing unsynchronized base stations to the mobile station 114.

Figure 2:
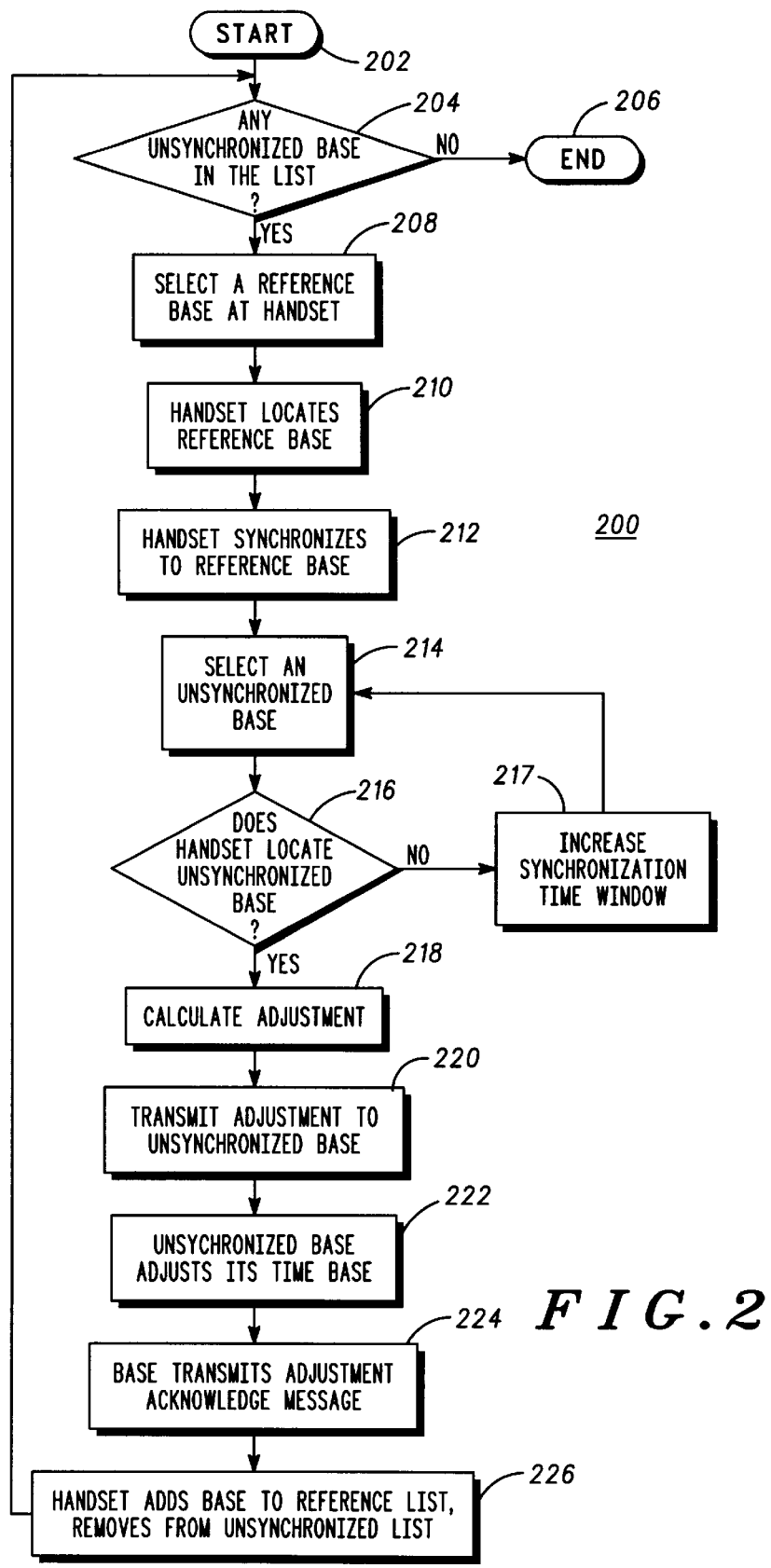
FIG. 2 is a flow diagram illustrating operation of the communication system of FIG. 1 according to the present invention

FIG. 2 is a flow diagram 200 illustrating a method for over-the-air synchronization of the communication system 100 according to the present invention. The method begins at step 202. At step 204, it is determined if any base station in the communication system 100 needs synchronizing to the master clock 103 at the controller 102. In the preferred embodiment, the handset maintains a list of unsynchronized base stations. At step 204, the handset examines the list to see if there are unsynchronized base stations remaining in the list. If not, the method terminates at step 206.

If a base station needs to be synchronized, the method continues at step 208 by selecting a reference base station at the mobile station 114. The reference base station is a base station which is already synchronized to the master clock 103. The reference base is synchronized by determining a timing offset which compensates for the propagation delay of the clock or timing signals received from the controller. The timing offset is stored at the base station and used for adjusting timing of each transmission by the base station.

The mobile station 114 preferably maintains a list of base station identifications, each uniquely identifying an associated base station. The list includes a list of reference base stations. The user of the mobile station 114 identifies the reference base station either by selecting a reference base station identification from the list of reference base station identifications, by entering the base station identification using the handset keypad, or by any appropriate technique. The mobile station 114 thus identifies the reference base station.

The method continues at step 210 in which the mobile station 114 locates the reference base station. The mobile station 114 receives transmissions during the time slot assigned to the reference base station and confirms the base station identification of the reference base station. To locate the reference base station, the mobile station 114 must be within the service area surrounding the reference base station.

In step 212, the mobile station 114 synchronizes to the reference base station. The mobile station detects a synchronization transmission transmitted by the reference base station and the unique identification of the reference base station transmitted by the reference base station and synchronizes the time base of the mobile station 114 in response to the synchronization transmission. The synchronization transmission is a synchronization signal such as a predetermined bit pattern which is used for synchronizing the mobile station 114 to the reference base station. For example, in a PHS system, the unique word is a predetermined bit pattern used as the synchronization transmission. In a DECT system, the S-field is used as the synchronization transmission. The S-field contains a predetermined bit pattern which is used for adjusting the time base of the mobile station. The mobile station 114 is in bit synchronization with the reference base station when the synchronization transmission is received from the reference base station at a predetermined time referred to herein as $t_S$.

At step 214, the mobile station 114 selects an unsynchronized base station. The user may display the list of unsynchronized base stations on the handset display and select the base identification for an unsynchronized base station using the handset keypad. Alternatively, the user may enter the unsynchronized base station identification using the handset keypad, enter a command using the keypad to cause the handset to search for unsynchronized base stations, or by any other suitable method. The unsynchronized base station is thus identified at the mobile station 114.

At step 216, the mobile station 114 attempts to locate the unsynchronized base station. The mobile station 114 is preferably within a service overlap area, such as service overlap area 117, which receives communication service from a synchronized base station (for example, base station 104) and an unsynchronized base station (for example, base station 106). The mobile station detects a synchronization transmission from the unsynchronized base station. If the mobile station 114 does not locate the unsynchronized base station on a first frequency, the mobile station 114 searches for the synchronization transmission on all assigned frequencies. The assigned frequencies are defined by the communication protocol, such as PHS or DECT. The user may have to move with the handset into a service overlap area such as service overlap area 117.

If the synchronization transmission is not located, at step 217 the mobile station increases the synchronization time window of the mobile station until the synchronization transmission is located. The synchronization window is the time surrounding the time of expected receipt of a synchronization transmission during which the synchronization transmission may be validly received. Increasing the synchronization time window increases the likelihood that the synchronization transmission will be detected when the handset and base station are not in time synchronization. After increasing the synchronization time window in step 217, the handset again attempts to locate the unsynchronized base in step 214 and step 216.

After detecting the unsynchronized base station, at step 218 the mobile station 114 calculates a synchronization adjustment for the unsynchronized base station. The synchronization adjustment corresponds to the timing difference between the local clock at the reference base station, which is synchronized with the master clock 103 at the controller 102 (FIG. 1) and the local clock at the unsynchronized base station.

Figure 3:
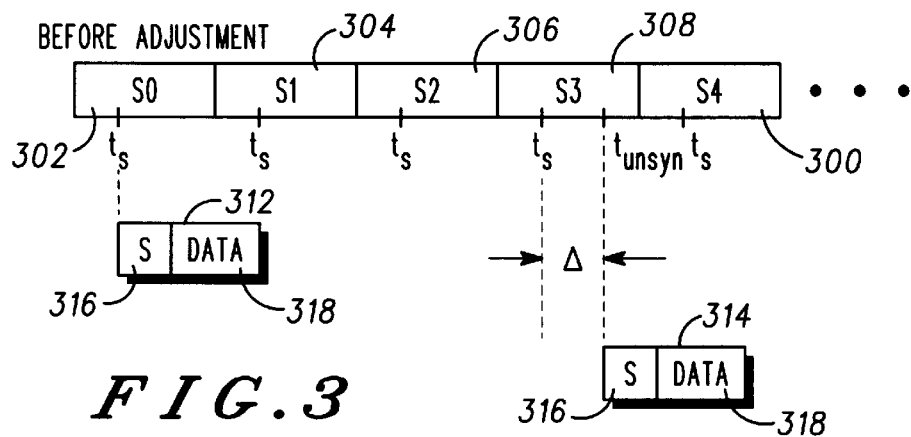
FIG. 3 illustrates a transmission pattern received by a mobile station in the communication system of FIG. 1.

As an example of an application of the method according to the present invention, FIG. 3 illustrates a transmission pattern received by a mobile station in the communication system 100 of FIG. 1. The transmission pattern includes a slot alignment 300 which defines the slot reception pattern expected by the mobile station. The slot alignment 300 includes a plurality of slots including a first slot 302, a second slot 304, a third slot 306 a fourth slot 308 and a fifth slot 310, designated S0, S1, S2, S3 and S4, respectively, in FIG. 3. The mobile station assumes that data will be transmitted by and received from base stations in alignment with these slots and according to the system protocol (PHS, DECT, or otherwise). These slots and other subsequently transmitted slots constitute a frame and each slot comprises a plurality of bits.

As is illustrated in FIG. 3, the mobile station receives first slot data 312 during the first slot 302 and second slot data 314 during the fourth slot 308. For purposes of this example, the first slot data 312 is received from a reference base station and the second slot data 314 is received from an unsynchronized base station. Each of first slot data 312 and second slot data 314 includes a synchronization transmission 316 and data 318. The synchronization transmission 316 is placed at the same location in each slot, designated $t_S$ in FIG. 3. The synchronization transmission 316 is typically a bit pattern which is predefined by the system protocol. In a DECT system, for example, the synchronization transmission from the unsynchronized base station includes a predetermined bit pattern in the S-field. The data 318 is any suitable data, such as voice data or control data or other data.

In FIG. 3, the first slot data 312 is received with its synchronization transmission 316 aligned with $t_S$, indicating that the mobile station and the reference base station which transmitted the first slot data 312 are synchronized. If there is a misalignment, even of a single bit, the mobile station adjusts its time base to maintain bit synchronization with the base station. In this manner, the mobile station synchronizes the time base in response to the synchronization transmission. The synchronization transmission from the reference base station includes a predetermined bit pattern. The second slot data 314 includes a synchronization transmission including a second predetermined bit pattern which is received at $t_{unsyn}$, a delay time Δ after time $t_S$, indicating that the base station which transmitted second slot data 314 is not synchronized with the mobile station and the reference base station. The delay time Δ is caused by propagation delay in the synchronization line between the controller 102 and the base station (FIG. 1) and by other factors. The predetermined bit pattern from the reference base station and the second predetermined bit pattern from the unsynchronized base station are preferably the same bit pattern, but may differ.

Corresponding to step 218, the mobile station 114 calculates the timing difference between the expected reception time, $t_S$, and the actual reception time, $t_{unsyn}$. That is, the mobile station 114 calculates the timing difference between the occurrence of the second predetermined bit pattern and the occurrence of the predetermined bit pattern. The synchronization adjustment corresponds to the difference between the expected reception time, $t_S$, and the actual reception time, $t_{unsyn}$. This difference is expressed in units of seconds, in units of bits or in any other convenient manner.

Figure 4:
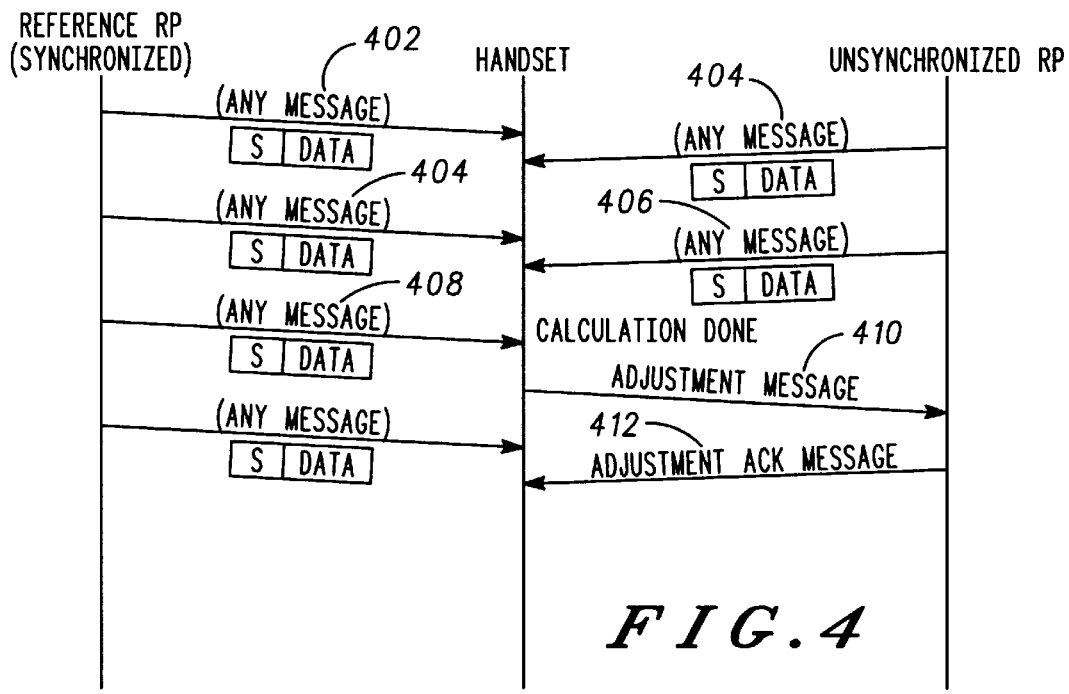
FIG. 4 illustrates communication between a synchronized base station, a mobile station and an unsynchronized base station in the communication system of FIG. 1.

FIG. 4 illustrates communication between a synchronized base station, a mobile station and an unsynchronized base station in the communication system of FIG. 1. Initially, a first message 402 is transmitted from the reference base station to the handset or mobile station 114. Subsequently, a second message 404 is transmitted from the unsynchronized base station. A third message 406 and a fourth message 408 are transmitted. The mobile station 114 locates the reference base station and the unsynchronized base station. The mobile station 114 calculates the synchronization adjustment, corresponding to step 218 (FIG. 2). To detect transmissions from both the reference base station and the unsynchronized base station, the mobile station 114 must be in a service overlap area such as service overlap area 117 (FIG. 1).

Referring again to FIG. 2, at step 220, the mobile station 114 transmits the synchronization adjustment to the unsynchronized base station. The transmitted synchronization adjustment includes data representative of the adjustment necessary to align the timing of the unsynchronized base station with the timing of the reference base station and the timing of the master clock, such as the difference between the expected reception time, $t_S$, and the actual reception time, $t_{unsyn}$ (FIG. 3). FIG. 4 illustrates transmission of the adjustment message 410.

At step 222, the unsynchronized base station adjusts synchronization of the unsynchronized base station in response to the synchronization adjustment. For example, the unsynchronized base station adjusts a time base in response to the synchronization adjustment to synchronize the unsynchronized base station.

At step 224, the unsynchronized base station transmits an adjustment acknowledge message to the mobile station 114. FIG. 4 illustrates transmission of the adjustment acknowledge message 412. If the mobile station 114 maintains a list of base station identifications, after synchronizing a base station to the mobile station, at step 226, the mobile station 114 according to the preferred embodiment adds a base station identification for the base station to the list of reference base station identifications and removes the base station identification for the base station from the list of unsynchronized base stations.

Following receipt of the adjustment acknowledge message and updating of the unsynchronized base station list and reference base station list, control returns to step 204 where it is determined if the list of unsynchronized base stations still contains base stations which need synchronizing. If so, the method illustrated in the flow diagram 200 is repeated. To repeat the method with the next unsynchronized base station, the user and the mobile station 114 may have to move to the coverage area of the next unsynchronized base station. If the list contains no more base stations which need synchronizing, execution ends at step 206.

Figure 5:
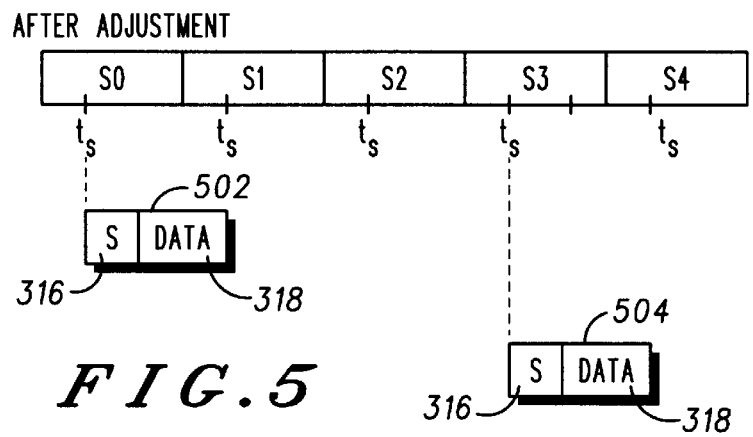
FIG. 5 illustrates a transmission pattern received by a mobile station in the communication system of FIG. 1.

FIG. 5 illustrates a transmission pattern received by a mobile station in the communication system 100 of FIG. 1 following synchronization adjustment of the unsynchronized base station. In FIG. 5, the mobile station 114 receives first slot data 502 from the reference base station, as before, and second slot data 504 for the formerly unsynchronized base station. For each received slot data, the synchronization transmission 316 is received aligned with the time $t_S$. Thus, the unsynchronized mobile station is now synchronized. If necessary, the mobile station may adjust its own time base to the reference base station or the formerly-unsynchronized base station to maintain bit, slot and frame synchronization.

As can be seen from the foregoing, the present invention provides a method for synchronizing base stations in a communication system. By synchronizing base stations with a mobile station, which is portable, the need is eliminated for a transmitter which has power to reach all base stations in the system. Also, the problem of varying propagation delays and associated timing inaccuracies may be readily eliminated by using the mobile station to synchronize unsynchronized base stations. The method may be readily implemented at the time of set-up of the communication system or periodically as a maintenance routine.

While a particular embodiment of the present invention has been shown and described, modifications may be made. For example, rather than operating in a service overlap area, the mobile station may obtain synchronization with a reference base station by moving into the reference base station's service area, then moving to the service area of an unsynchronized base station for synchronizing the unsynchronized base station. It is therefore intended in the appended claims to cover all such changes and modifications which fall within the true spirit and scope of the invention.

What is claimed is:

1. A method for synchronizing base stations in a communication system, the communication system including a plurality of base stations configured for radio communication with a mobile station, the method including the steps of:

synchronizing the mobile station to a reference base station; and thereafter, synchronizing unsynchronized base stations of the plurality of base stations to the mobile station, thereby establishing synchronization between the unsynchronized base stations and the reference base station.

2. The method for synchronizing base stations in a communication system as recited in claim 1 further comprising the steps of:

maintaining at the mobile station a list of base station identifications, the list including a list of reference base station identifications; and after synchronizing a base station to the mobile station, adding a base station identification for the base station to the list of reference base station identifications.

3. The method for synchronizing base stations in a communication system as recited in claim 2 wherein the step of synchronizing the mobile station comprises the steps of:

selecting a reference base station identification from the list of reference base station identifications;

detecting a synchronization transmission from the reference base station corresponding to the reference base station identification; and synchronizing a time base of the mobile station to the reference base station in response to the synchronization transmission.

4. The method for synchronizing base stations in a communication system as recited in claim 3 wherein the synchronization transmission from the reference base station includes a first predetermined bit pattern and wherein the step of synchronizing unsynchronized base stations comprises the steps of:

selecting an unsynchronized base station identification;

detecting a synchronization transmission from an unsynchronized base station of the unsynchronized base stations corresponding to the unsynchronized base station identification, the synchronization transmission including a second predetermined bit pattern;

calculating a timing difference between occurrence of the second predetermined bit pattern and occurrence of the first predetermined bit pattern; and transmitting a synchronization adjustment from the mobile station to the unsynchronized base station in response to the timing difference.

5. The method for synchronizing base stations in a communication system as recited in claim 4 wherein the method further comprises the steps of:

at the unsynchronized base station, adjusting a time base of the unsynchronized base station in response to the synchronization adjustment;

transmitting an adjustment acknowledge message to the mobile station; and at the mobile station, in response to the adjustment acknowledge message, adding the unsynchronized base station identification to the list of reference base station identifications.

6. A method for over-the-air synchronization adjustment in a communication system, the communication system including a plurality of base stations and a mobile station, the method comprising the steps of:

at the mobile station, synchronizing the mobile station to a reference base station;

detecting an unsynchronized base station, the unsynchronized base station being different from the reference base station;

calculating a synchronization adjustment for the unsynchronized base station;

transmitting the synchronization adjustment from the mobile station to the unsynchronized base station; and at the unsynchronized base station, adjusting synchronization of the unsynchronized base station in response to the synchronization adjustment.

7. The method for over-the-air synchronization adjustment in a communication system as recited in claim 6 wherein the step of synchronizing the mobile station to the reference base station comprises the steps of:

identifying the reference base station;

detecting a synchronization transmission transmitted by the reference base station; and synchronizing a time base of the mobile station in response to the synchronization transmission.

8. The method for over-the-air synchronization adjustment in a communication system as recited in claim 7 wherein the synchronization transmission transmitted by the reference base station includes a first predetermined bit pattern and wherein the step of detecting an unsynchronized base station comprises the steps of detecting a synchronization transmission transmitted by the unsynchronized base station, the synchronization transmission transmitted by the unsynchronized base station including a second predetermined bit pattern, and wherein the step of calculating the synchronization adjustment includes the step of determining a difference between occurrence of the second predetermined bit pattern and occurrence of the first predetermined bit pattern.

9. The method for over-the-air synchronization adjustment in a communication system as recited in claim 8 wherein the synchronization adjustment comprises the difference between occurrence of the second predetermined bit pattern and occurrence of the first predetermined bit pattern.

10. A method for synchronizing an unsynchronized base station in a communication system, the communication system including a plurality of base stations configured for radio communication with a mobile station, the plurality of base stations including a reference base station and the unsynchronized base station the unsynchronized base station being different from the reference base station, the method including the steps of:

at the mobile station, detecting a synchronization transmission from the reference base station;

synchronizing a time base of the mobile station in response to the synchronization transmission;

detecting a synchronization transmission from the unsynchronized base station;

calculating a synchronization adjustment for the unsynchronized base station;

transmitting the synchronization adjustment to the unsynchronized base station; and at the unsynchronized base station, adjusting a time base of the unsynchronized base station in response to the synchronization adjustment to synchronize the unsynchronized base station.

11. The method for synchronizing an unsynchronized base station as recited in claim 10 further comprising the step of, at the unsynchronized base station, transmitting an adjustment acknowledge message to the mobile station.

12. The method for synchronizing an unsynchronized base station as recited in claim 10 wherein the step of detecting a synchronization transmission from the unsynchronized base station includes the steps of:

searching for the synchronization transmission from the unsynchronized base station on all assigned frequencies; and if the synchronization transmission from the unsynchronized base station is not located, increasing a synchronization window of the mobile station until the synchronization transmission from the unsynchronized base station is detected.

13. The method for synchronizing an unsynchronized base station as recited in claim 10 further comprising the step of storing at the mobile station a list of base station identifications and wherein the step of identifying the reference base station includes the step of selecting a reference base station identification from the list of base station identifications.

* * * * *